(12) United States Patent
Nard

(10) Patent No.: US 8,275,961 B2
(45) Date of Patent: Sep. 25, 2012

(54) SECURE DELIVERY OF DIGITAL MEDIA VIA FLASH DEVICE

(75) Inventor: Michael Lee Nard, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 12/474,162

(22) Filed: May 28, 2009

(65) Prior Publication Data

US 2010/0306450 A1 Dec. 2, 2010

(51) Int. Cl.
*G06F 12/00* (2006.01)
(52) U.S. Cl. .......... 711/163; 711/103
(58) Field of Classification Search .......... 711/103, 711/163, E12.001
See application file for complete search history.

(56) References Cited

U.S. PATENT DOCUMENTS

| | | | |
|---|---|---|---|
| 5,371,793 A * | 12/1994 | Kimura | 713/193 |
| 6,385,677 B1 | 5/2002 | Yao | |
| 6,829,672 B1 | 12/2004 | Deng et al. | |
| 6,904,493 B2 * | 6/2005 | Chiao et al. | 711/103 |
| 7,069,370 B2 | 6/2006 | Sukegawa et al. | |
| 7,111,292 B2 | 9/2006 | Bonnett et al. | |
| 7,181,625 B2 * | 2/2007 | Peled et al. | 713/180 |
| 7,350,228 B2 * | 3/2008 | Peled et al. | 726/6 |
| 7,359,993 B1 | 4/2008 | Durairaj et al. | |
| 7,457,897 B1 * | 11/2008 | Lee et al. | 710/74 |
| 7,464,269 B2 * | 12/2008 | Johnson et al. | 713/176 |
| 7,469,343 B2 | 12/2008 | Ray et al. | |
| 7,478,235 B2 | 1/2009 | England et al. | |
| 7,702,984 B1 * | 4/2010 | Lee et al. | 714/742 |
| 2001/0010663 A1 * | 8/2001 | Nakazawa et al. | 369/2 |
| 2004/0163135 A1 | 8/2004 | Giaccherini et al. | |
| 2006/0184799 A1 * | 8/2006 | Seo et al. | 713/182 |
| 2006/0184806 A1 | 8/2006 | Luttmann et al. | |
| 2007/0074050 A1 | 3/2007 | Camiel | |

OTHER PUBLICATIONS

Sarah Dean, FreeOTFE, 2004, listed in Wikipedia.*
TRUECRYPT—Free open-source disk encryption, Feb. 2, 2004.*

* cited by examiner

*Primary Examiner* — Pierre-Michel Bataille (57) ABSTRACT

A flash device for secure delivery of media content is provided. The flash device can include a controller module and a memory module. The controller module can include at least one local central processing unit, at least one register having factory initialized data written therein, and at least one memory module interface. The factory initialized data can include: a vendor identification ("VID") string, a product identification ("PID") string, and a manufacturer identification string. The memory module can include at least one read-only partition having digital data disposed therein, where at least a portion of the digital data comprises at least one machine executable instruction set.

18 Claims, 5 Drawing Sheets

SECURE DELIVERY OF DIGITAL MEDIA VIA FLASH DEVICE

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

Traditionally, digital media in the form of software, applications, and/or data files has been delivered to computing devices using magnetic or optical storage devices, for example diskettes, compact discs ("CDs"), or digital versatile discs ("DVDs"). More recently, with the growing prevalence of the internet personal local area networks ("LANs") and commercial networks such as the 3G and 4G wireless networks established by cellular communications providers, downloadable media content has become more widespread.

Computing devices originally contained multiple media readers, for example 8 inch disk drives, 5¼ inch disk drives, 3½ inch disk drives, CD drives and DVD drives were installed in numerous numbers and combinations on workstations, desktops and portable computers. With the recent trend of miniaturization of computing devices, the chassis of the computing device often has insufficient area to accommodate the aforementioned, rather large, previous generation, media readers. Often, the input/output capabilities of modern computing devices are limited to one or more serial ports, one or more parallel ports, and/or one or more wireless interfaces (IEEE 802.11 "WiFi" or Bluetooth™). Secure delivery of media to modern and future small chassis computing devices must therefore adapt to the reduced number of available input/output options.

SUMMARY OF THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

A flash device for secure delivery of media content is provided. The flash device can include a controller module and a memory module. The controller module can include at least one local central processing unit, at least one register having factory initialized data written therein, and at least one memory module interface. The factory initialized data can include: a vendor identification ("VID") string, a product identification ("PID") string, and a manufacturer identification string. The memory module can include at least one read-only partition having digital data disposed therein, where at least a portion of the digital data comprises at least one machine executable instruction set.

A secure media delivery system is also provided. The secure media delivery system can include an external device, and a flash device. The external device can include a means for communicative coupling to the flash device, a means for executing a machine-executable instruction set, a means for storing digital data, a means for storing a basic input/output system ("BIOS"), and a means for providing at least one unique external device identifier ("EDID"). The flash device can include a control means, a storage means, and a means for validating a read-only, machine-executable, instruction set prior to transferring at least a portion of the instruction set to the external device. The flash device control means can include a means for executing a machine-readable instruction set and a means for storing factory initialized data. The factory initialized data can include: a vendor identification ("VID") string, a product identification ("PID") string, and a manufacturer identification string. The storage means can include a means for storing at least one read-only, machine-executable, instruction set.

A method for the secure delivery of media is also provided. The method can include communicatively coupling a flash device to an external device, validating the flash device. If the validation is successful, transferring at least a portion of digital media contained in a read only portion of the flash device to the external device. If the validation is unsuccessful, preventing the transfer of at least a portion of digital media contained in a read only portion of the flash device to the external device. The flash device can include a controller module and a memory module. The controller module can include at least one central processing unit and at least one register having factory initialized data disposed therein. The factory initialized data can include: a vendor identification ("VID") string, a product identification ("PID") string, and a manufacturer identification string. The memory module can include at least one read-only partition having digital data disposed therein, where at least a portion of the digital data comprises at least one machine executable instruction set. The external device can include at least one communication interface, at least one central processing unit, at least one memory module, at least one basic input/output system ("BIOS") module, and at least one EDID.

As used herein, the terms "external device identifier," "device identifier," "unique device identifier," and "EDID" are used synonymously to indicate a data string that uniquely identifies an external device communicatively coupled to the flash device. Such an external device can be a "stand-alone" device, or a device housed, embedded, or comprising another device, system, or combination of systems and/or devices without departing from the scope of one or more envisioned embodiments.

As used herein the term "interface" and the plural "interfaces" can refer to any system, device or combination of systems and/or devices used to promote or otherwise provide electrical communication between two or more devices. As used herein, the term "interface" can refer interchangeably to wired or wireless forms of interconnection. Typical, non-limiting, examples of wired interfaces can include male/female plug connections, terminal strips, terminal blocks, screw terminals, screw connections, jumpers, line splices, and the like. Typical, non-limiting, examples of wireless interfaces can include radio frequency ("RF") connections, Institute of Electrical and Electronics Engineers ("IEEE") 802.11(b)(g)(n) wireless local area network (WLAN—"WiFi") connections, cellular connections (e.g. CDMA, GSM, and the like); Bluetooth® connections, and any present or future similar wireless data transmission technologies.

A "communicative coupling", or a connection by which entities are "communicatively coupled", is one in which signals, electrical signals, physical communications or impulses, and/or logical communications may be sent and/or received. Typically, a communicative coupling includes a physical interface, an electrical interface, and/or a data interface, but it is to be noted that a communicative coupling can include differing combinations of these or other types of connections sufficient as necessary to permit communication. For example, two entities can be communicatively coupled by being able to communicate signals to each other directly or through one or more intermediate entities like a processor, operating system, firmware logic, software, or other entity. Logical and/or physical communication channels can be used to create an communicative coupling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
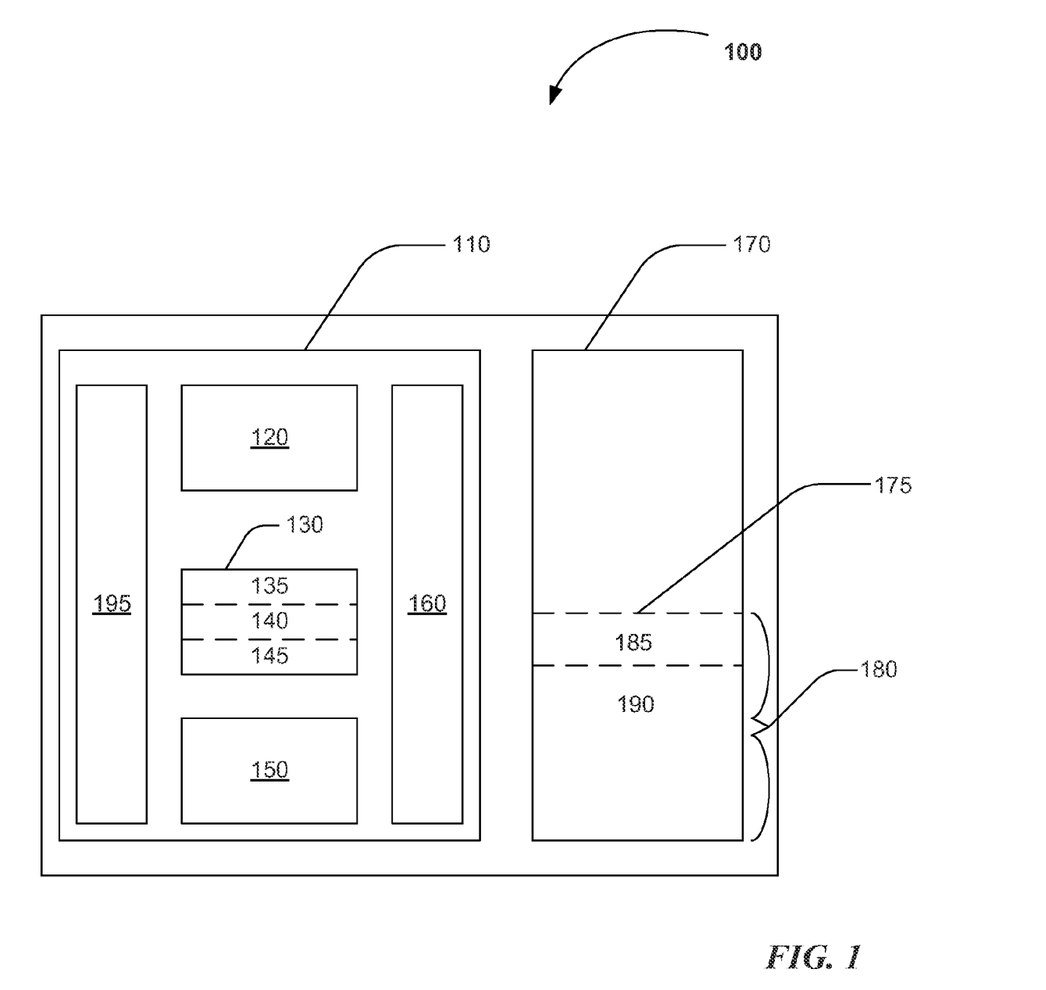
FIG. 1 is a schematic diagram depicting an exemplary flash device for securely delivering digital media according to one or more embodiments described herein.

FIG. 1 is a schematic diagram depicting an exemplary flash device 100 according to one or more embodiments. In one or more embodiments, the flash device 100 can include a controller module 110 communicatively coupled to a storage module 170. In one or more embodiments, the controller module 110 and the storage module 170 can be communicatively coupled using a storage interface 160. In one or more embodiments, the controller module 110 can include one or more central processing units 120; one or more registers 130 containing factory initialized data 135, 140, 145; one or more storage registers 150; the storage interface 160; and one or more communications interfaces 195. In one or more embodiments, the storage module 170 can include a memory module having at least one read only partition 175 encompassing at least a portion of the available data storage within the storage module 170. In one or more embodiments, digital media 180, including, but not limited to, one or more automatically executable instruction sets 185, and one or more machine-executable instruction sets 190 can be disposed in, on, or about the read-only partition 175.

In one or more embodiments, the controller module 110 can include one or more central processing units ("CPUs") 120. In one or more embodiments, the one or more CPUs 120 can include a reduced instruction set computer ("RISC") controller. In one or more embodiments, the one or more CPUs 120 can be an 8-bit controller, a 16-bit controller, a 32-bit controller, or a 64-bit controller. In one or more embodiments, the one or more CPUs 120 can implement a use and allocation control strategy for the storage module 170 communicatively coupled thereto. In one or more embodiments, the one or more CPUs 120 can manage the reading and writing of digital data between and external device and the storage unit 170. In one or more embodiments, the one or more CPUs 120 can include one or more clocking or synchronization devices, for example a 12 MHz oscillator. In one or more embodiments, the one or more CPUs can include one or more error detection and/or correction ("ECC") devices, for example one or more ECC calculators using 1-bit error correction and 2-bit error detection. In one or more embodiments, the one or more controllers 120 can include support for hardware sector buffering. In one or more embodiments, the one or more controllers 120 can include support for marking of bad blocks within the storage module 170. In one or more embodiments, the one or more controllers 120 can include support for implementing one or more wear leveling algorithms within the storage module 170.

The controller module 110 can include one or more registers 130. In one or more embodiments, the factory initialized data 135, 140, 145 can be disposed in, on, or about the one or more registers 130. In one or more embodiments, the one or more registers 130 can include one or more read-only data storage registers, for example one or more read-only memory ("ROM") modules. In one or more embodiments, the one or more registers 130 can include readable and writeable memory storage registers, for example one or more electrical erasable programmable read-only memory ("EEPROM") modules.

At least a portion of the factory initialized data disposed in the one or more registers 130 can include, but is not limited to, a vendor identification data ("VID") string 135. In one or more embodiments, the VID string 135 can be used to uniquely identify the vendor of the controller module 110. In one or more embodiments, the VID string 135 can be used to uniquely identify the vendor of the flash memory device 100. In one or more embodiments, the VID string 135 can be a uniquely assigned string provided by the Universal Serial Bus Implementers Forum ("USB-IF"), for example the hexadecimal string 03f0(H) assigned to, and uniquely identifying, the Hewlett-Packard Company.

At least a portion of the factory initialized data disposed in the one or more registers 130 can include, but is not limited to, a product identification data ("PID") string 140. In one or more embodiments, the PID string 140 can be used to uniquely identify the type or class of flash device 100. In one or more embodiments, the PID string 140 can be a uniquely assigned string provided by the vendor to identify a product or a product class, for example 0a17(H) assigned by Hewlett-Packard Company to uniquely identify a Color LaserJet 3700 series printer.

At least a portion of the factory initialized data disposed in the one or more registers 130 can include, but is not limited to, a manufacturer identification data string 145. In one or more embodiments, the manufacturer identification data string 145 can be used to uniquely identify the type or class of flash device 100. In one or more embodiments, the manufacturer identification data string 145 can be a uniquely assigned string provided by the vendor to identify a product or a product class. In one or more embodiments, the manufacturer identification can include a combination of VID and PID strings to provide a unique string combination identifying both the vendor and the product in a single data string. In one or more embodiments, the manufacturer identification and the product identification can include two or more strings that uniquely identify the flash device 100, for example, the manufacturer identification can be the character string "HP," identifying Hewlett Packard as the manufacturer and the product identification can be the character string "SuperUSB" particularly identifying the flash device by product name. In one or more specific embodiments, at least a portion of the factory initialized data disposed in the one or more registers 130 can include, but is not limited to, a VID string 135, a PID string 140, a manufacturer identification data string 145.

In one or more embodiments, one or more storage registers 150 can be disposed in, on, or about the controller module 110. In one or more embodiments, the one or more storage registers 150 can include one or more non-volatile data storage registers adapted to retain digital data in the absence of an electrical current. In one or more embodiments, the one or more storage registers 150 can include one or more readable and writeable memory storage registers, for example one or more EEPROM storage registers. In one or more embodiments, the one or more storage registers 150 can include one or more storage registers suitable for the storage of digital data, for example, the storage of one or more EDID strings written, copied, or otherwise transferred to the one or more storage registers 150 from an external device communicatively coupled to the flash device 100. In one or more specific embodiments, at least a portion of the one or more storage registers 150 can be used for the non-volatile storage of one or more EDID strings supplied by an external device, for example a computing device communicatively coupled to the flash device 100.

The storage interface 160 can be communicatively coupled to, and disposed in, on, or about, the controller module 110. In one or more embodiments, the storage interface 160 can include any interface suitable for the bidirectional reading and writing of data to and from the storage module 170. In one or more embodiments, the storage interface 160 can control, paginate, address, or otherwise alter or control the flow of digital data to and from the storage module 170. In one or more embodiments, the storage interface 160 can read data from the storage module 170 at a speed of about 4 MB/s or more; about 8 MB/s or more; about 12 MB/s or more; or about 16 MB/s or more. In one or more embodiments, the storage interface 160 can write digital data to the storage module 170 at a speed of about 4 MB/s or more; about 8 MB/s or more; about 12 MB/s or more; or about 16 MB/s or more.

In one or more embodiments, a communications interface 195 can be disposed in, on, or about the flash device 100. The communications interface 195 can include one or more electronic interfaces known to or within the computer arts. In one or more embodiments, the communications interface 195 can include an industry standard interface, for example a universal serial bus ("USB") interface, a secure digital ("SD") interface, a compact flash ("CF") interface, a memory stick ("MS") interface, a serial advanced technology attachment ("SATA") interface, or an external SATA ("eSATA") interface. In one or more embodiments, the communications interface 195 can be communicatively coupled to the controller module 110. In one or more embodiments, the communications interface 195 can be communicatively coupled to the storage module 170. In one or more embodiments, the communications interface 195 can be communicatively coupled to both the controller module 110 and the storage module 170.

In one or more embodiments, the storage module 170 can include one or more read-only partitions 175. In one or more embodiments, the one or more read only partitions 175 can be encrypted or otherwise protected against all or selected data read and/or data write operations. In one or more embodiments, the one or more read-only partitions 175 can include one or more automatically-executable instruction sets 185, one or more machine executable instruction sets 190, or any combination or frequency thereof. In one or more embodiments, the storage module 170 can have a storage capacity of about 256 megabytes (MB) or more; about 512 megabytes (MB) or more; about 1024 MB or more; about 2048 MB or more; about 4096 MB or more; about 8 gigabytes (GB) or more; about 16 GB or more; about 32 GB or more; about 64 GB or more; or about 128 GB or more.

In one or more embodiments, the one or more automatically-executable instruction sets 185 can include one or more instruction sets suitable for validating the installation, copying, or transferring of at least a portion of the one or more machine-executable instruction sets 190 from the flash device 100 to a communicatively coupled external device. In one or more embodiments, the one or more automatically-executable instruction sets 185 can include one or more instruction sets adapted to simulating the performance and functionality of a CD or DVD to a communicatively coupled external device.

In one or more embodiments, the one or more machine-executable instruction sets 190 can include any digital media file. Suitable digital media files can include, but are not limited to one or more digital data files, for example one or more files containing audio and/or video content and/or one or more files containing a machine-executable instruction set. Suitable machine executable instruction sets can include, but are not limited to, one or more executable files; one or more system files; one or more configuration files; one or more application files; one or more library files; or any frequency or combination thereof.

Figure 2:
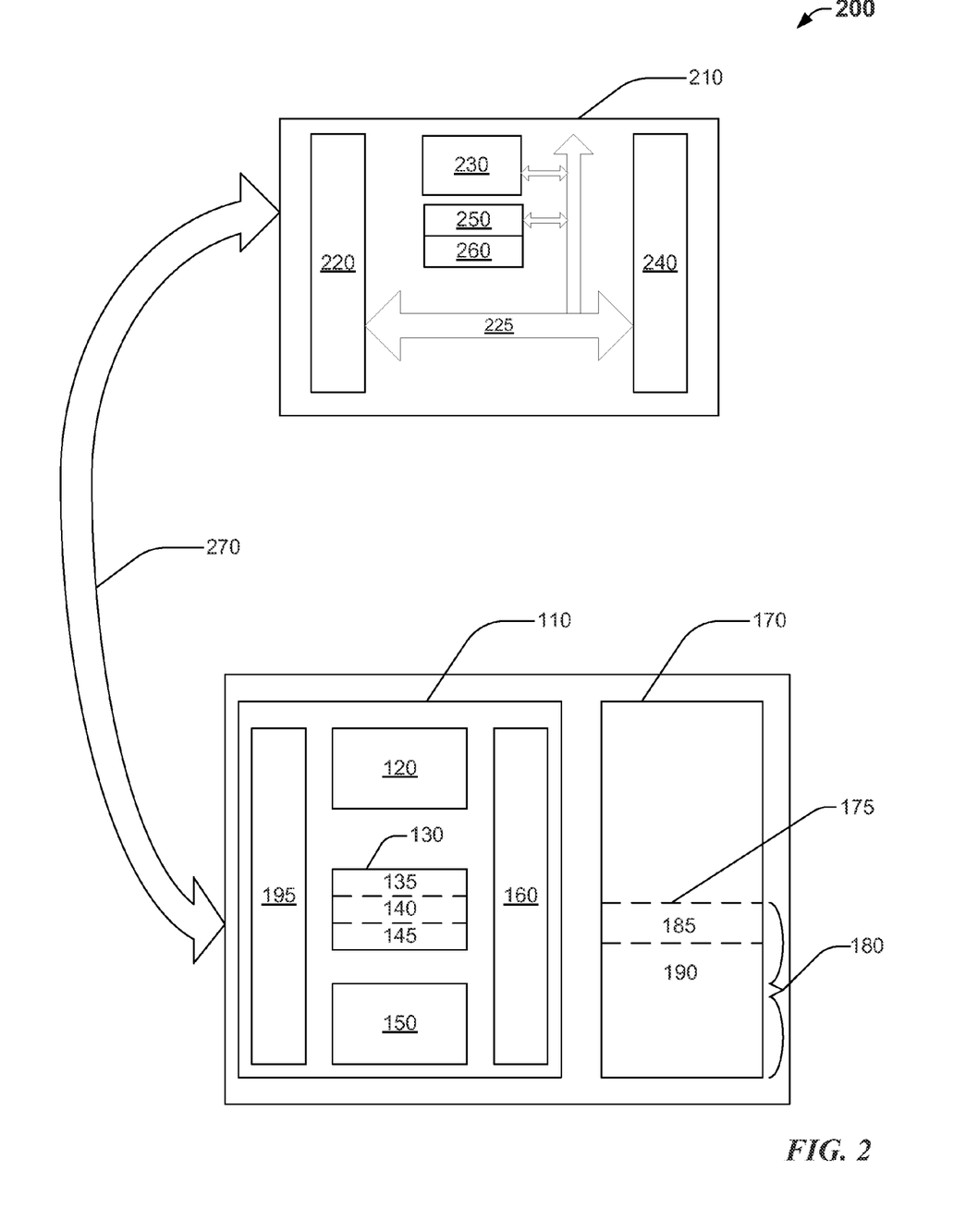
FIG. 2 is a schematic diagram depicting an exemplary system for securely delivering digital media incorporating the exemplary flash device depicted in FIG. 1 and a communicatively coupled exemplary external device according to one or more embodiments described herein.

FIG. 2 is a schematic diagram depicting an exemplary system 200 for securely delivering digital media incorporating the exemplary flash device 100 depicted in FIG. 1 and a communicatively coupled exemplary external device 210 according to one or more embodiments. In one or more embodiments, the external device 210 can include, but is not limited to, one or more of the following: a communications interface 220, one or more data transfer busses 225, a central processing unit 230, a memory module 240, a basic input/output system ("BIOS") 250, and a unique EDID 260.

In one or more embodiments, the exemplary flash device 100 can be communicatively coupled to the external device 210 via one or more wired or wireless connections 270. In one or more specific embodiments, the communicative coupling 270 of the flash device 100 to the external device 210 can be accomplished using one or more industry standard communications interfaces 220, for example a universal serial bus ("USB") interface, a secure digital ("SD") interface, a compact flash ("CF") interface, or a memory stick ("MS") interface. In one or more embodiments, the communications interface 220 can adapt or otherwise bridge an external interface such as a connector or wireless transceiver, to the one or more data transfer busses 225.

The CPU 230 can be disposed in, on, or about the external device 210. In one or more embodiments, the CPU 230 can control, limit, or otherwise operate at least a portion of the communications interface 220 and memory module 240. In one or more embodiments, the CPU 230 can be any device suitable for executing the one or more machine-executable instruction sets 190. In one or more embodiments, the CPU 230 can include one or more processor cores, for example a dual or quad core processor having multiple CPUs integrated into a single CPU "package." In one or more embodiments, the CPU 230 can be communicatively coupled to the communications interface 220 via the one or more data transfer busses 225.

The memory module 240 can be communicatively coupled to the communications interface 220 using the one or more data transfer busses 225. The memory module 240 can be any combination of volatile and non-volatile memory in any form, frequency, or configuration. In one or more embodiments, at least a portion of the memory module 240 can include volatile memory, for example random access memory ("RAM"). In one or more embodiments, at least a portion of the memory module 240 can include non-volatile memory, for example a hard disk drive ("HDD"), or a solid state drive ("SSD"). In one or more embodiments, at least a portion of the memory module 240 can include one or more removable storage devices, for example a serial advanced technology attachment ("SATA") devices. In one or more embodiments, at least a portion of the memory module 240 can include or external SATA ("eSATA") compliant external HDD or SSD.

In one or more embodiments, the BIOS 250 can be communicatively coupled to the one or more CPUs 230 via one or more data transfer busses 225. In one or more embodiments, the BIOS 250 can be disposed in, on, or about the CPU 230. In one or more embodiments, the BIOS 250 can include, but is not limited to one or more machine executable instruction sets encoded in a non-volatile, read-only, memory ("ROM"). In one or more embodiments, at least a portion of the BIOS 250 can control or otherwise initiate operations such as a power-on self test, and/or provide low-level operational control of one or more peripheral devices such as keyboards or other input devices, disk drives, and/or monitors or other output devices disposed in, on, or about, or otherwise communicatively coupled to the external device 210.

In one or more embodiments, the unique EDID 260 can be disposed in, on, or about the external device 210. The EDID 260 can be any data string capable of uniquely identifying the external device 210, for example a hexadecimal network interface card (NIC) adapter identifier. In one or more embodiments, the unique EDID 260 can particularly identify the external device 210, distinguishing the device from all other external devices 210. In one or more embodiments, the unique EDID 260 can be a digital data string at least 8 bytes in length; at least 16 bytes in length; at least 32 bytes in length; at least 64 bytes in length; at least 128 bytes in length; or at least 256 bytes in length.

The connection 270 linking the flash device 100 and the external device 210 can include, but are not limited to, one or more wired connections or wireless connections. Exemplary wired connections can include, but are not limited to, one or more industry standard wired interfaces, for example a USB interface, a CF interface, a SD or HDSD interface, a SATA interface, an IEEE 1394 "Firewire" interface, or the like. Exemplary wireless connection can include, but are not limited to, one or more industry standard wireless interfaces, for example an 802.11b/g/n wireless interface, a Bluetooth® wireless interface, or the like.

Figure 3:
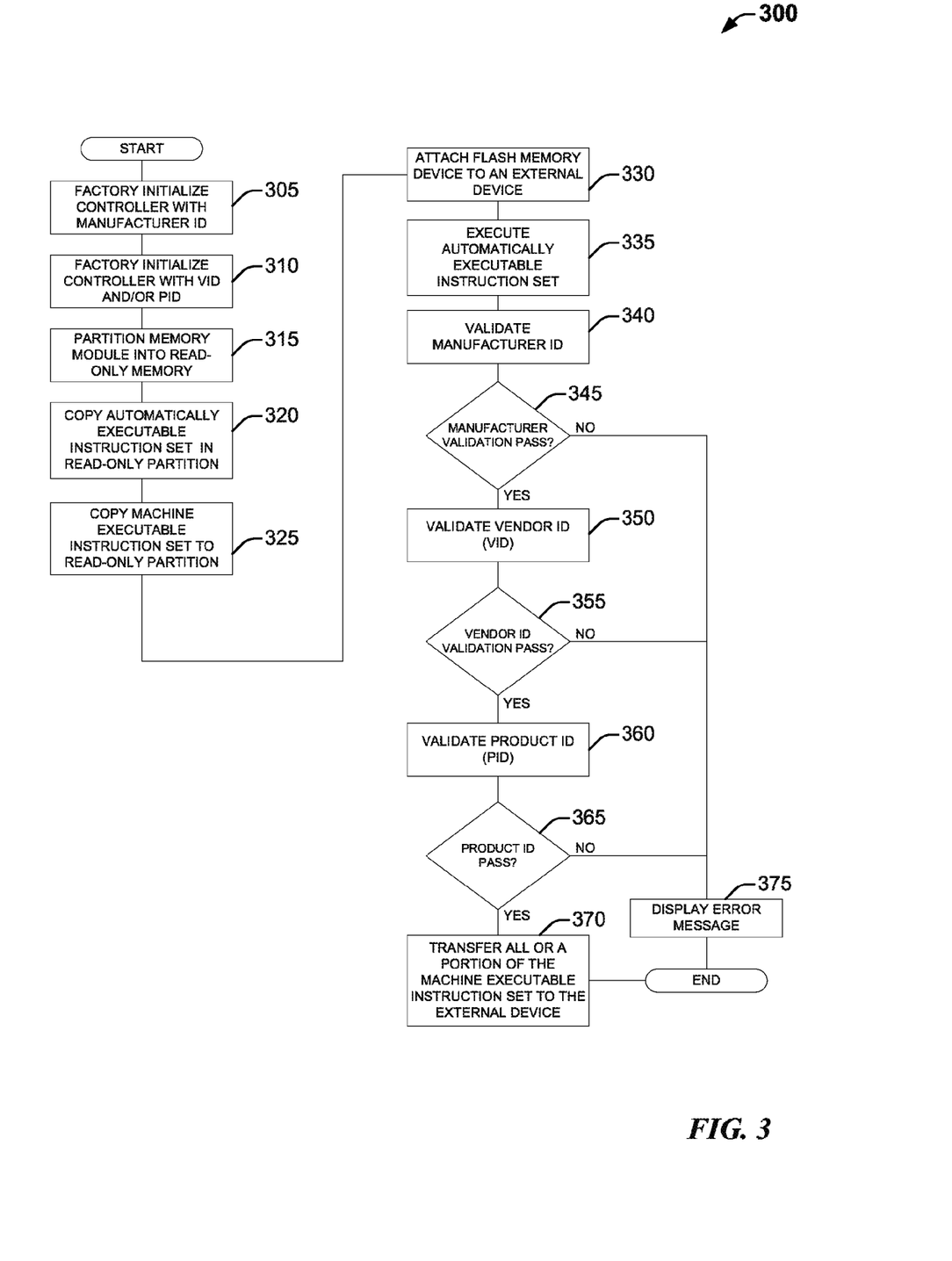
FIG. 3 is a logic flow diagram depicting an exemplary method for securely delivering digital media using a flash device as depicted in FIG. 1, according to one or more embodiments described herein.

FIG. 3 is a logic flow diagram depicting an exemplary method 300 for securely delivering digital media using a flash device 100 as depicted in FIG. 1, according to one or more embodiments. In one or more embodiments, the method 300 can be broadly divided into two stages, the first stage, depicted in steps 305 through 325, includes factory initialization of the flash device 100. The second stage, depicted in steps 330 through 375, includes securely delivering digital media from the flash device 100 to an external device 210, for example the delivery system 200 as depicted in FIG. 2.

In one or more embodiments, the flash device 100 can be factory initialized by loading at least a portion of the manufacturer's identification 145 into the controller module 110 of the flash device as depicted in 305. In one or more embodiments, the flash device 100 can be factory initialized by loading at least a portion of the vendor identification 135 into the controller module 110 of the flash device as depicted in 310. In one or more embodiments, the flash device 100 can be factory initialized by loading at least a portion of the product identification 140 into the controller module 110 of the flash device as depicted in 310.

In one or more embodiments, in 315, at least a portion of the storage module 170 can be partitioned into a read-only memory partition 175. In one or more embodiments, in 320, an automatically-executable instruction set 185 can be disposed in whole or in part within the read-only memory partition 175. In one or more embodiments, at least a portion of the automatically-executable instruction set 185 can cause the flash device 100 to appear to the external device 210 as a communicatively connected 270 optical media, for example a CD-ROM or a DVD-ROM. In one or more embodiments, at least a portion of one or more machine-executable instruction sets 185 can be partially or completely disposed within the one or more read only portions 175 in 325. The successful completion of the factory initialization steps 305 through 325 can provide a flash device 100 suitable for the secure delivery of digital media.

In one or more embodiments, the flash device 100, can, in 330, be attached by a user to an external device 210. In one or more specific embodiments, a USB interface can be used to link the flash device communication interface 195 disposed with the external device communications interface 220. After communicatively coupling the flash device 100 to the external device 210, in 335, the one or more CPUs 230 can execute at least a portion of the automatically-executable instruction set 185. In one or more specific embodiments, at least a portion of the automatically-executable instruction set 185 can execute or otherwise perform one or more validation procedures, for example the exemplary validation procedure in steps 340 through 375, to confirm that the digital media 180 disposed in, on, or about the flash device 100 is valid, authentic or otherwise genuine, i.e. not pirated, copied or otherwise counterfeited.

In one or more embodiments, the automatically-executable instruction set 185 can validate the manufacturer identification 145 disposed within the flash device 100 in 340. In one or more embodiments, the validation can include, but is not limited to, the comparison of the manufacturer identification contained in the factory initialized data register 130 with at least a portion of one or more predetermined values; for example one or more predetermined values disposed within the automatically executable instruction set 185. If the manufacturer identification 145 does not partially or completely correspond to at least a portion of one or more predetermined values in 345, the external device 210 can display an error message in 375 prior to terminating the delivery of the digital media 180 to the external device 210.

In one or more embodiments, if the manufacturer identification 145 partially or completely corresponds to at least a portion of one or more predetermined values in 345, the automatically-executable instruction set 185 can validate the VID 135 disposed within the flash device 100 in 350. In one or more embodiments, the validation can include the comparison of the VID 135 disposed within the factory initialized data register 130 with one or more predetermined values; for example one or more predetermined values disposed within the automatically-executable instruction set 185. If the VID 135 does not partially or completely correspond to at least a portion of one or more predetermined values in 355, the external device 210 can display an error message in 375 prior to terminating the delivery of the digital media 180 to the external device 210.

In one or more embodiments, if the VID 135 validation partially or completely corresponds to at least a portion of one or more predetermined values in 355, the automatically-executable instruction set 185 can validate the PID 140 disposed within the flash device 100 in 360. In one or more embodiments, the validation can include the comparison of at least a portion of the PID 140 disposed within the factory initialized data register 130 with at least a portion of one or more predetermined values; for example one or more predetermined values disposed within the automatically executable instruction set 190. If the PID 140 does not partially or completely correspond to at least a portion of one or more predetermined values in 365, the external device 210 can display an error message in 375 prior to terminating the delivery of the digital media to the external device 210.

It is important to note that while three distinct validation steps, i.e. steps 340 through 365 are depicted in FIG. 3, the validation regimen performed by the automatically-executable instruction set 185 can alternatively comprise any one, any two, or all three validation steps described above, arranged in any order without departing from the scope of one or more embodiments.

In one or more embodiments, after the automatically-executable instruction set 185 successfully completes one or more validations by comparing at least a portion of the manufacturer ID, VID, and/or PID with at least a portion of one or more predetermined values in 345, 355, and/or 365, the automatically-executable instruction set 185 can transfer at least a portion of the digital media 180, for example one or more machine-executable instruction sets 190, from the flash device 100 to the memory module 240 disposed in, on, or about the external device 210 in 370.

Figure 4:
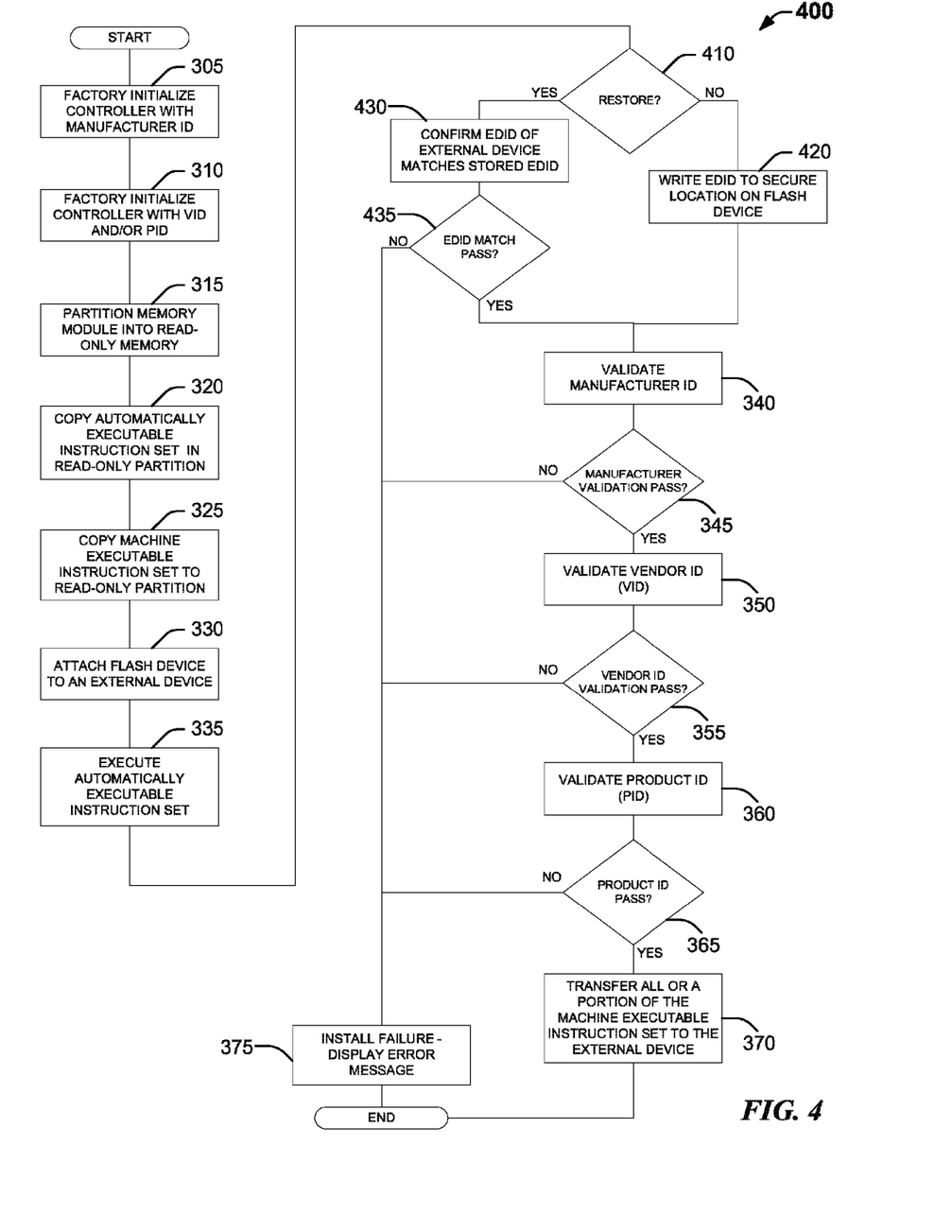
FIG. 4 is a logic flow diagram depicting another exemplary method for securely delivering digital media using a flash device as depicted in FIG. 1, according to one or more embodiments described herein.

FIG. 4 is a logic flow diagram depicting another exemplary method 400 for securely delivering digital media using a flash device 100 as depicted in FIG. 1, according to one or more embodiments. In one or more embodiments, the factory initialization stage and the communicative coupling of the flash device 100 to the external device 210 (steps 305 through 335) can be as described in detail above with regards to FIG. 3. In one or more embodiments, one or more storage registers 150 adapted for storage of the external device EDID can be disposed in, on, or about the flash device 100.

After communicatively coupling the flash device 100 to the external device 210 in 330 and executing at least a portion of the automatically-executable instruction set 185 in 335, the controller module 110 disposed within the flash device can determine whether the user is attempting to: (a) restore at least a portion of the digital media 180 previously installed on the external device 210, or (b) freshly install at least a portion of the digital media 180 on the external device 210 for the first time.

Determining whether a restore or an install procedure is being requested can be ascertained for example by examining the contents of the one or more storage registers 150 for the presence of a previously written EDID data string. The presence of an EDID data string in the one or more storage registers 150 can indicate a restore process, while the absence of an EDID data string in the one or more storage registers 150 can indicate an install process.

In one or more embodiments, where an EDID data string is not found within the one or more storage registers 150 in 410, the unique EDID data string 260 disposed in, on, or about the external device 210 can, in 420, be written, transmitted, or otherwise transferred in whole or in part to the one or more storage registers 150. The transfer of the unique EDID 260 from the external device 210 to the one or more registers 150 can, in one or more embodiments, serve to associate, affiliate, or otherwise affix the digital media 180 contained on the flash device 100 with a specific external device 210. Such an association or affiliation can prevent or otherwise prohibit the transfer, copy, or installation of digital media 180 from a single flash device 100 to multiple external devices 210. After writing, transmitting or otherwise transferring the unique EDID 260 from the external device to the one or more storage registers 150 disposed in the flash device in 420, the manufacturer ID can be validated in 340.

In one or more embodiments, where EDID data is found within the one or more storage registers 150 in 410, the automatically-executable instruction set can validate the EDID data in 430. In one or more embodiments, the validation of the EDID data can include, but is not limited to, comparing at least a portion of the EDID data disposed in the one or more storage registers 150 with at least a portion of the unique EDID data 260 disposed in the external device 210. By comparing the EDID data disposed in the flash device 100 with the EDID data disposed in the external device 210, the transfer, transmission, or copying of the digital media disposed on the flash device 100 can be limited or otherwise restricted to only the external device 210 which had previously received the transfer or copy of the digital media from the flash device 100. If the EDID disposed in the one or more storage registers does not match the EDID of the external device 210, an error message can be displayed in 375 prior to terminating the delivery of the digital media to the external device 210. If the EDID disposed in the one or more storage registers matches the EDID of the external device 210, the manufacturer ID can be validated in 340.

The validation of the manufacturer ID, VID, and/or PID can be identical to the validation procedures described in detail above with respect to FIG. 3. Recall, that it is important to note that while three distinct validation steps, i.e. steps 340 through 365 are depicted in FIG. 4, the actual validation regimen performed by the automatically-executable instruction set 185 can alternatively comprise any one, any two, or all three validation steps described above, arranged in any order without departing from the scope of one or more embodiments.

Figure 5:
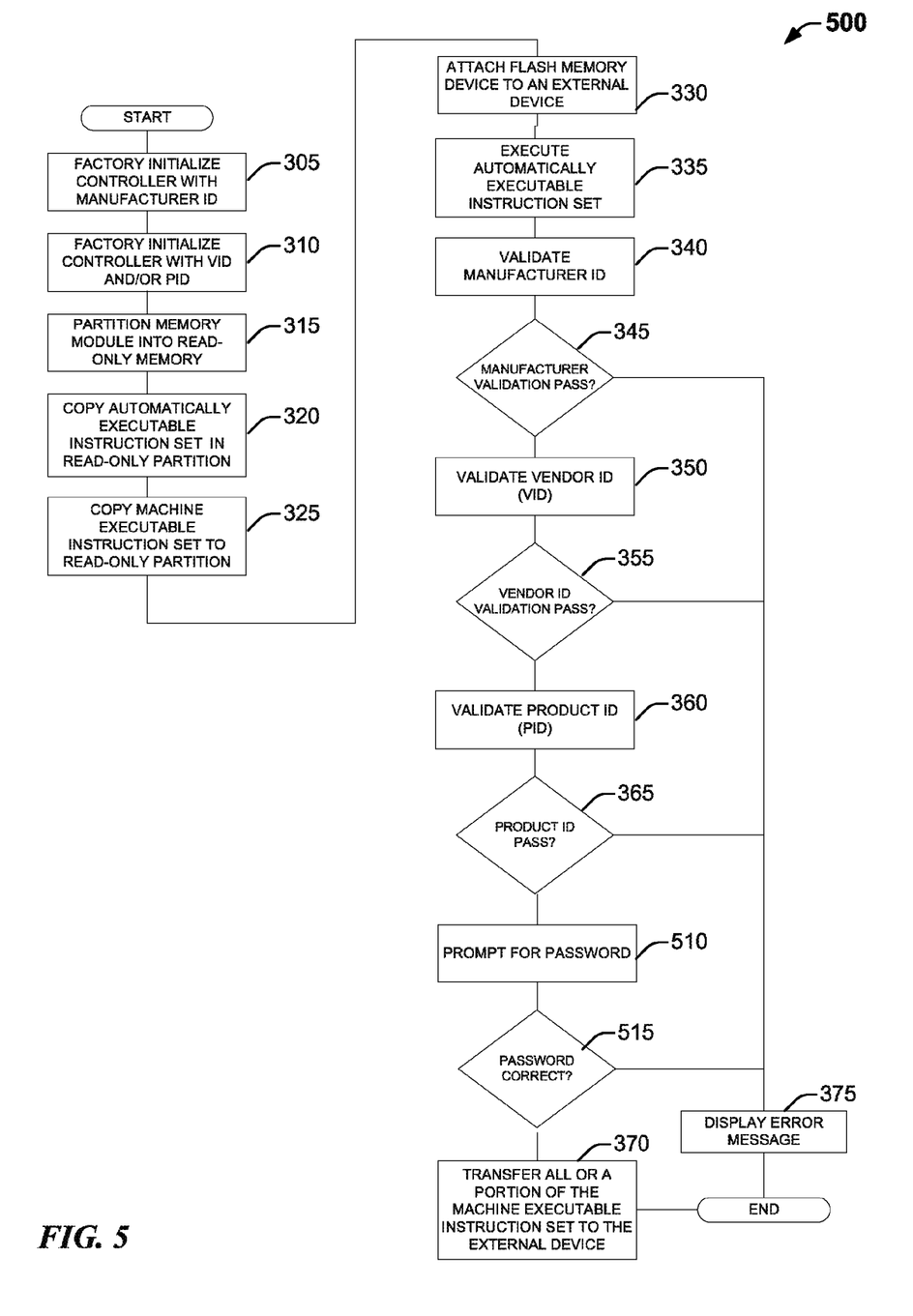
FIG. 5 is a logic flow diagram depicting yet another exemplary method for securely delivering digital media using a flash device as depicted in FIG. 1, according to one or more embodiments described herein.

FIG. 5 is a logic flow diagram depicting yet another exemplary method 500 for securely delivering digital media using a flash device 100 as depicted in FIG. 1, according to one or more embodiments. In one or more embodiments, the factory initialization stage, communicative coupling of the flash device 100 to the external device 210, and the validation of the manufacturer ID, VID, and PID can be identical to those described in detail above with respect to FIG. 3 (i.e., 305 through 365 as depicted in FIG. 3).

In one or more embodiments, the automatically-executable instruction set 185 can prompt for the entry of a user password in 510 prior to transferring all or a part of the digital media from the flash device 100 to the external device 210. In one or more specific embodiments, the user password can include any predetermined data string, for example a plurality of characters such as those forming a CD or DVD "key."

In one or more embodiments, one or more passwords can be disposed in, on, or about the automatically-executable instruction set 185. In one or more embodiments, the automatically-executable instruction set 185 can, in 510, prompt for user entry of at least a portion of the one or more passwords. After receiving the user entered password the automatically-executable instruction set 185 can validate the password in 515. In one or more embodiments, the validation of the password can include, but is not limited to, comparing at least a portion of the password supplied by the user with at least a portion of the password disposed within the automatically-executable instruction set 185. By comparing the user supplied password with the password disposed within the automatically-executable instruction set 185, the transfer, transmission, or copying of the digital media 180 disposed in, on, or about the flash device 100 can be limited or otherwise restricted to users having access to the password supplied with the original flash device 100. If the user supplied password in 510 does not match the password disposed within the automatically-executable instruction set 185, an error message can be displayed in 375 prior to terminating the delivery of the digital media 180 to the external device 210. If the user supplied password in 510 matches the password disposed within the automatically-executable instruction set 185, at least a portion of the digital media 180 disposed in, on, or about the flash device 100 can be transferred, conveyed, copied, or otherwise transmitted from the flash device 100 to the external device 210 in 370.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A flash device for secure delivery of digital media comprising:
   a controller module comprising:
      at least one central processing unit;
      at least one register having factory initialized data written therein;
      wherein the factory initialized data comprises:
         a vendor identification (VID) string;
         a product identification (PID) string;
         a manufacturer identification string;
         at least one memory module interface; and
   a memory module comprising:
      at least one read-only partition having digital data disposed therein;
      wherein at least a portion of the digital data comprises at least one machine executable instruction set; and
      at least one register to receive an external device identifier (EDID) from an external device communicatively coupled to the flash device
      wherein the digital data disposed within the memory module further comprises an automatically-executable instruction set; wherein the automatically-executable instruction set adapted to prevent the execution of at least a portion of the at least one machine executable instruction set except upon the supply of a data string matching a predetermined data string.

2. The device of claim 1, further comprising a communication interface selected from the group of interfaces consisting of: a universal serial bus (USB) interface, a secure digital (SD) interface, a compact flash (CF) interface, a memory stick (MS) interface, a serial advanced technology attachment (SATA) interface, or an external SATA (eSATA) interface.

3. The device of claim 1, wherein the read-only partition comprises a single read-only partition comprising the entire storage capacity of the memory module.

4. The device of claim 1, wherein the external device comprises an electronic computing device comprising:
   at least one communication interface;
   at least one central processing unit (CPU) adapted to at least partially execute the machine executable instruction set;
   at least one memory module;
   at least one basic input/output system (BIOS); and
   at least one external device identifier ("EDID") operable to uniquely identify the external device.

5. The device of claim 4, wherein the at least one EDID is accessible via the basic input/output system (BIOS) of the external device.

6. The device of claim 1, wherein at least a portion of the at least one read-only, machine executable, instruction set comprises at least one automatically executable file at least partially executable by the external device CPU.

7. A flash device for secure delivery of digital media comprising:
   a controller module comprising:
      at least one central processing unit;
      at least one register having factory initialized data written therein;
      wherein the factory initialized data comprises:
         a vendor identification (VID) string;
         a product identification (PID) string;
         a manufacturer identification string;
         at least one memory module interface; and a memory module comprising:
- at least one read-only partition having digital data disposed therein;
- wherein at least a portion of the digital data comprises at least one machine executable instruction set; and
- at least one register to receive an external device identifier (EDID) from an external device communicatively coupled to the flash device;

wherein the digital data disposed within the memory module further comprises an automatically-executable instruction set; and wherein the automatically-executable instruction set prevents the execution of at least a portion of the at least one machine executable instruction set except upon the supply of an EDID from an external device attached to the flash device matching an EDID stored in the at least one controller register.

8. A media delivery system, comprising:
an external device comprising:
- a means for communicative coupling to a flash device; and
- a means for providing at least one unique external device identifier ("EDID") from an external device communicatively coupled to the flash device;

a flash device comprising:
- a control means for the flash device comprising:
  - a means for executing a machine readable instruction set;
  - a means for storing factory initialized data;
  - wherein the factory initialized data comprises:
    - a vendor identification (VID) string;
    - a product identification (PID) string; and
    - a manufacturer identification string; and
- a storage means for the flash device, comprising:
  - a means for storing at least one read-only, machine executable, instruction set; and
  - a means for validating the read-only, machine executable, instruction set prior to transferring at least a portion of the at least one read-only, machine executable, instruction sets to the external device
    - wherein the means for validating the read-only, machine executable, instruction set prior to transferring at least a portion of the machine executable instruction set to the external device comprises:
      - disposing an automatically-executable instruction set within the read-only partition of the memory module, the automatically-executable instruction set comprising at least one set of machine executable code and at least one predetermined data string;
      - executing at least a portion of the automatically-executable instruction set upon communicative coupling of the flash device to the external device; and
      - prompting a user to enter at least a portion of the predetermined data string.

9. The system of claim 8, further comprising a means for storing the EDID communicated from the external device communicatively coupled to the controller module.

10. The system of claim 8, wherein the means for validating the read-only, machine executable, instruction set prior to transferring at least a portion of the machine executable instruction set to the external device comprises: a means for validating at least a portion of the vendor identification (VID) string disposed within the flash device controller.

11. The system of claim 8, wherein the means for validating the read-only, machine executable, instruction set prior to transferring at least a portion of the machine executable instruction set to the external device comprises: a means for validating at least a portion of the product identification (PID) string disposed within the flash device controller.

12. The system of claim 8 wherein the means for validating the read-only, machine executable, instruction set prior to transferring at least a portion of the machine executable instruction set to the external device comprises: a means for validating at least a portion of the manufacturer's identification string disposed within the flash device controller.

13. A method for delivering digital data, comprising:
communicatively coupling a flash device to an external device;
wherein the flash device comprises:
a controller module comprising:
- at least one central processing unit;
- at least one register having factory initialized data disposed therein;
- wherein the factory initialized data comprises:
  - a vendor identification (VID) string;
  - a product identification (PID) string;
  - a manufacturer identification string; and
a memory module comprising:
- at least one read-only partition having digital data disposed therein;
- wherein the digital data comprises at least one machine executable instruction set; and
- wherein the external device comprises an electronic computing device having at least one unique external device identifier (EDID);

validating the flash device;
if the validation is successful, transferring at least a portion of the digital data contained in the at least one read only partition to the external device; and
if the validation is unsuccessful, preventing the transfer of at least a portion of the digital data contained in the at least one read only partition to the external device; and
the method further comprising receiving, in at least one register of the flash device, the EDID from the communicatively coupled external device.

14. The method of claim 13, wherein validating the flash device comprises validating at least a portion of the manufacturer identification string disposed within the flash device controller.

15. The method of claim 13, wherein validating the flash device comprises validating at least a portion of the VID string disposed within the flash device controller.

16. The method of claim 13, wherein validating the flash device comprises validating at least a portion of the PID string disposed within the flash device controller.

17. The method of claim 13, wherein validating at least a portion of the EDID disposed within the at least one register within the flash device.

18. The method of claim 13, wherein validating the flash device comprises:
disposing an automatically-executable instruction set within the read-only partition of the memory module, the automatically-executable instruction set comprising at least one set of machine executable code and at least one predetermined data string;
executing at least a portion of the automatically-executable instruction set upon communicative connection of the flash device to the external device; and prompting a user of the external device to enter at least a portion of the predetermined data string.

* * * * *